US006366617B1

(12) United States Patent
Ryan

(10) Patent No.: US 6,366,617 B1
(45) Date of Patent: Apr. 2, 2002

(54) PROGRAMMABLE FILTER FOR REMOVING SELECTED USER DATA FROM AN MPEG-2 BIT STREAM

(75) Inventor: Robert T. Ryan, Langhorne, PA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/169,331

(22) Filed: Oct. 9, 1998

(51) Int. Cl.[7] .................................................. H04N 7/12
(52) U.S. Cl. ............................. 375/240.25; 375/240.26; 375/240.29
(58) Field of Search ....................... 375/240.25, 240.26, 375/240.27, 240.28, 240.29; 348/425.1, 425.2, 425.3, 425.4

(56) References Cited

U.S. PATENT DOCUMENTS

| 5,699,124 A | * 12/1997 | Nuber et al. .................. 348/465 |
| 5,801,782 A | 9/1998 | Patterson ...................... 348/473 |
| 5,898,695 A | * 4/1999 | Fujii et al. .................... 370/464 |
| 6,014,171 A | * 1/2000 | Koyanagi et al. ............ 348/402 |

FOREIGN PATENT DOCUMENTS

| EP | 0602621 A2 | * 6/1994 | ............ H04N/7/13 |
| EP | 0674442 A | 9/1995 | ............ H04N/7/24 |
| EP | 0710027 | 5/1996 | ............ H04N/7/24 |
| EP | 0735776 A2 | 10/1996 | ............ H04N/7/52 |
| GB | 2306864 A | 5/1997 | ............ G11B/20/12 |
| JP | 08 181988 | 7/1996 | ............ H04N/7/30 |

OTHER PUBLICATIONS

Jill Boyce et al. SDTV Receivers with HDTV Decoding Capability Feb. 1995, ACATS Technical Subgroup Meeting, May 1995, Washington DC.

Jill Boyce et al. Low–Cost All Format ATV Decoding with Improved Quality, Hitachi America, Ltd, Princeton, N.J., 30th SMPTE Advanced Motion Imaging Conference, Paper #11, Feb. 2, 1996.

Jack S. Fuhrer, The All Format Decoder, Hitachi America, Ltd. Jun. 3, 1996.

Recommended Practices for Video Encoding Using the ATSC Digital Televion Standard—Consideration of Down-sampling Decoders, SMPTE Jun. 6, 1996.

Discussion on Recommended Practices for North American ATV Video Coding—Consideration of Downsampling Decoders, Hitachi 5/96.

S. Dutta et al.; "Smart Video Streams: 101 Uses of the User Data field in MPEG"; Conference Record of The Asilomar Conference on Signals, Systems and Computers; p. 1462, col. 2, line 23–27, 1996.

(List continued on next page.)

Primary Examiner—Vu Le
(74) Attorney, Agent, or Firm—Ratner & Prestia

(57) ABSTRACT

An MPEG-2 video decoder which identifies and removes selected User Data fields from an MPEG-2 bit-stream before storing the bit-stream into the VBV buffer of the decoder. The decoder monitors the MPEG-2 bit-stream with a state machine to determine the level of the record (Sequence, Group of Pictures or Picture) that is currently being decoded. The decoder also monitors the bit-stream for User Data Start Codes. When a User Data Start Code is encountered, the state of the state machine is compared to preprogrammed commands provided by a microprocessor. Only if these commands require the decoding of User Data at a particular level will the User Data following the User Data Start Code be passed to the VBV buffer. The commands provided by the microprocessor may be changed to selectively inhibit the storage of more or less User Data depending on the identified need for the User Data and the relative burden that processing the User Data through the VBV buffer places on the decoder.

10 Claims, 4 Drawing Sheets

OTHER PUBLICATIONS

"Transmission of Non–Telephone Signals. Information Technology—Generic Coding of Moving Pictures And Associated Audio Information: Video", ITU–T; Telecommunication Standardization Sector of ITU; pp. A–b, I–VIII, 1; 1998.

European Search Report; Jun. 29, 2001.

* cited by examiner

PROGRAMMABLE FILTER FOR REMOVING SELECTED USER DATA FROM AN MPEG-2 BIT STREAM

BACKGROUND OF THE INVENTION

The present invention relates to decoders for processing image data which has been compressed according to a format, MPEG-2, specified by the moving pictures experts group (MPEG) and in particular to a preprocessing step which selectively deletes unneeded User Data from the MPEG-2 data stream prior to decoding.

Video signal compression performed under the MPEG-2 standard is inherently variable rate. Video data in a sequence of images is compressed based on the spatial frequency content of either a sequence of images or of differences in spatial frequency content among the images in the sequence. If an image sequence has low spatial frequency content or if successive images differ only slightly, the amount of compressed data that is transmitted to reproduce the image sequence may be greatly reduced.

The syntax for the MPEG-2 standard is set forth in International Standard 13818-2 Recommendation ITU-T H.262 entitled "Generic Coding of Moving Pictures and Associated Audio Information: Video" and available from ISO/IEC, Geneva, Switzerland, which is incorporated herein by reference for its teaching of the MPEG-2 video coding standard. This standard defines several layers of data records which are used to convey both audio and video data. For the sake of simplicity, the decoding of the audio data is not described herein. Encoded data which describes a particular video sequence is represented in several nested layers, the Sequence layer, the Group of Pictures layer, the Picture layer, the Slice layer and the Macroblock layer. Each layer record, except for the Macroblock layer, begins with a start code that identifies the layer. The layer record includes header data and payload data.

Under the MPEG-2 standard, a prescribed amount of data is received and stored before the decoding operation may begin. This amount of data is specified in the header portion of the Sequence layer as the value vbv_buffer_size_value. This value also determines an amount of memory to be reserved for a buffer, the VBV buffer, which holds the bit-stream data before it is decoded.

As described below with reference to FIGS. 3A through 3D, many of the records of the MPEG-2 bit-stream include an Extension Data field and/or a User Data field which may comprise many bytes of data. This Extension Data is provided in the bit-stream to allow the MPEG-2 standard to be extended without redefining its basic syntax. The User Data does not represent an extension of the MPEG-2 standard. It is provided as a means for a signal provider to furnish special-purpose information to those who receive the signal. It may be used for any purpose that is agreed to by the signal provider and the decoder manufacturer. For example, it may be used to send production information from a main signal source (e.g. a network production facility) to a signal distributor (e.g. a network member station). Other uses for this data may be to send multi-lingual close-caption information or other data that may overlay the image such as, for example, a custom on-screen display.

While a particular receiver may be configured to process some of the User Data records, other User Data may be unknown to the receiver and thus, may be superfluous.

SUMMARY OF THE INVENTION

The present invention is embodied in an MPEG-2 decoder which includes a bit-stream parser that identifies and removes superfluous User Data from an MPEG-2 bit-stream before storing the bit-stream into the VBV buffer of the decoder.

According to one aspect of the invention, the parser includes circuitry which detects the level in the bit-stream syntax at which the User Data occurs and circuitry which selectively removes only the User Data which is associated with selected levels.

According to yet another aspect of the invention, the levels at which User Data is to be removed are provided to the parser by a microprocessor and may be programmed.

DETAILED DESCRIPTION

Figure 1:
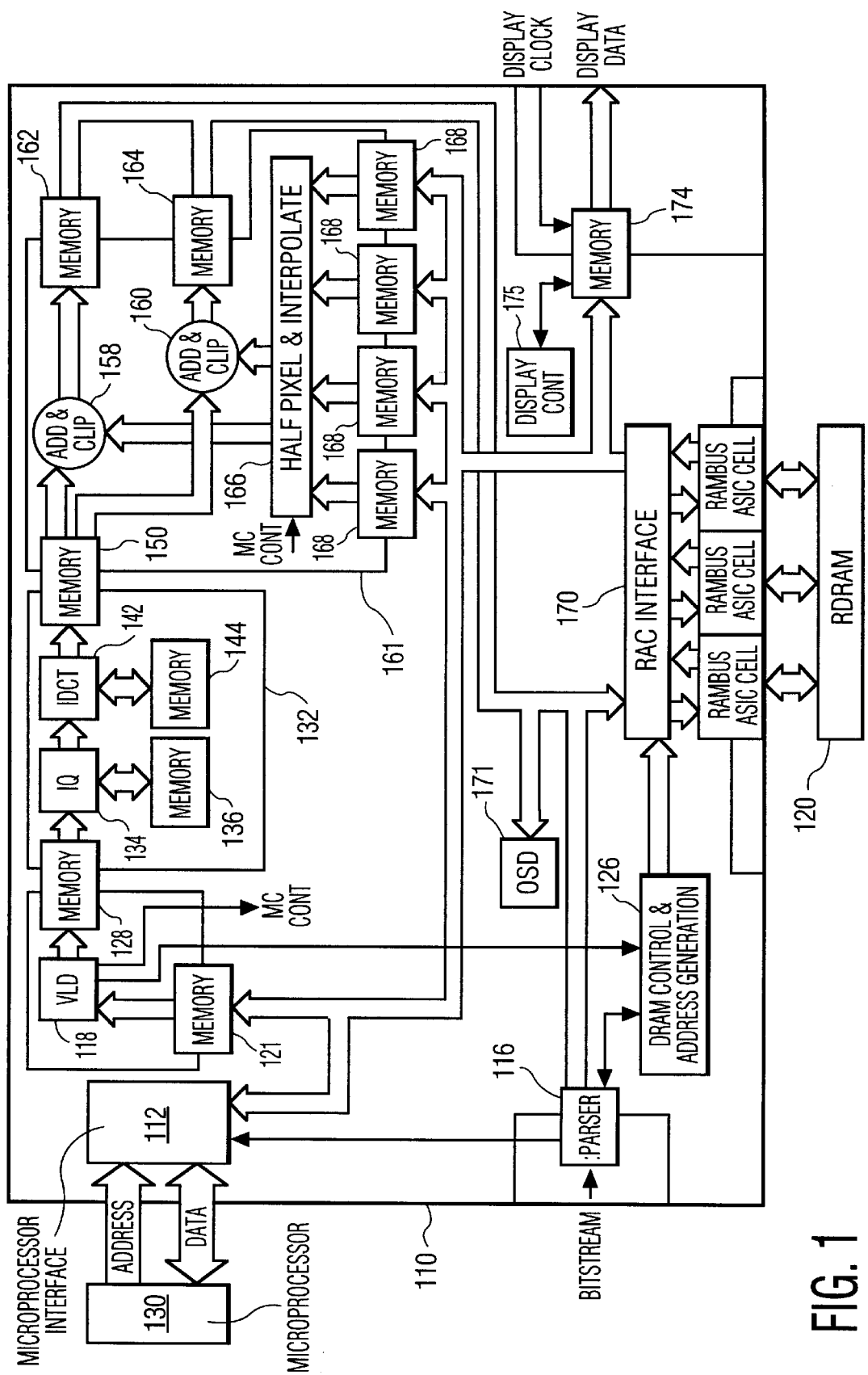
FIG. 1 is a block diagram of an MPEG-2 video decoder which includes an embodiment of the present invention.

FIG. 1 is a block diagram of an exemplary decoder system which embodies the present invention. This system includes three components, a decoding processor 110 a high-bandwidth memory 120 and a control microprocessor 130. The high-bandwidth memory 120 used in the exemplary embodiment of the invention may be, for example, a RAM-BUS memory system which is available from NEC and Toshiba.

Briefly, the decoder shown in FIG. 1 operates as follows. As a first step, the decoder integrated circuit (IC) 110 is initialized by the microprocessor 130 in a particular configuration. If, for example, the decoder is to be used to decode 525P signals, the appropriate control values are applied to the internal circuitry of the decoding processor 110 via the microprocessor interface 112. For the sake of clarity, the control bus between the microprocessor 130 and each of the elements in the IC 110 has been omitted. This bus may be, for example, a conventional I$^2$C bus.

Once the IC 110 has been initialized, the input bit-stream is applied to a parser 116. The parser, described below with reference to FIG. 2, stores the bit-stream in the memory 120. In addition, the parser identifies start codes for the Sequence, Group of Pictures and Picture layers and notifies the microprocessor 130 of the memory locations at which these start codes are stored. In the exemplary decoder shown in FIG. 1, the microprocessor 130 decodes the header information for these layers. The parser also identifies User Data fields in each of these records and selectively inhibits the storage of the identified User Data into the memory 120, as described below with reference to FIGS. 2 and 4.

The DRAM control and address generator 126, controls the RAC interface 170 to store the bit-stream data into the memory 120. In the exemplary embodiment of the invention, a portion of the memory 120 is reserved for use as a buffer to hold the input bit-stream. This buffer area corresponds to the VBV buffer which is specified in the MPEG-2 standard.

After the bit-stream data is written into the VBV buffer area of memory 120, it is read from the high-bandwidth memory 120 as needed by the variable length decoder (VLD) 118 and stored in the buffer memory 121, also under control of the DRAM control and address generation circuitry 126. The memory 121 is a FIFO memory which is filled in bursts from the memory 120 and emptied by the VLD 118 as dictated by the bit-stream syntax.

The VLD 118 parses the Slice and Macroblock layers of the bit-stream to generate blocks of quantized discrete cosine transform coefficient values. These blocks of values are applied a FIFO memory 128. This FIFO memory buffers the data between the VLD 118 on the one hand and the Macroblock decoding circuitry 132 on the other hand. This memory may also perform the inverse scan function defined in the MPEG-2 standard. The circuitry 132 includes an inverse quantizer 134 which converts the quantized coefficient values into a uniform format and an inverse discrete cosine (IDCT) processor 142 which converts the frequency domain coefficients into spatial domain pixel values or differential pixel values. The inverse quantizer 134 and IDCT processor 142 include respective memories 136 and 144 to aid in the processing operations. The output data provided by the circuitry 132 are blocks of pixel values or differential pixel values.

Where the values in the blocks are differential pixel values, they are combined with values from previously decoded image frames (reference frames) by a motion compensation processor 161 which includes add and clip circuitry 158 and 160. These circuits, in turn, obtain the image data from the reference frames, which are provided by the half pixel and interpolation circuitry 166. The interpolation circuitry 166 obtains the image picture elements (pixels) from the previously decoded frames using buffer memories 168. Data values for these memories are provided from the high-bandwidth memory 120 by the DRAM control and address generation circuitry 126.

The decoded image data produced by the motion compensation processor 161 is stored into buffer memories 162 and 164. From the buffer memories 162 and 164 the decoded image data is stored into the memory 120 for display or for use as reference frame data in decoding motion compensated encoded data from later received image fields or frames. Data to be displayed is stored into the memory 120 in block format and transferred, in raster-scan format, to a memory 174, for example, to be provided to a display device (not shown) under control of a display processor 175.

An on-screen display (OSD) processor 171 is also coupled to provide data to, and to receive data from the memory 120 via the DRAM control and address generator 126 and RAC interface 170. In the exemplary embodiment of the invention, the OSD processor 171 is used to generate user menus and close-caption text which overlay the displayed image.

As shown in FIG. 1, the memory 120 receives data from the parser 116, the microprocessor 130, the motion compensation processor 161 and the OSD processor 171 and provides data to the VLD 118, the motion compensation processor 161, the OSD processor 171 and the display controller 175. Furthermore, the memory 120 is a dynamic random access memory (DRAM) and, so, periodically needs to be refreshed, requiring further memory accesses. Each of these memory accesses is prioritized, with the display processor 175 having the highest priority and the OSD processor 171 having the lowest priority.

Depending on the image sequence being processed, it may be difficult to schedule all of the memory access requests that are pending at any given time. In these instances, the lower priority memory access requests are delayed.

When high-definition image sequences (e.g. main-profile, high-level MP@HL) are decoded, the lower priority memory access requests may be unduly 30 delayed due to the volume of information being stored into the memory and fetched from the memory 120 just to decode and display the high-definition image sequence. High-definition image sequences typically require more memory accesses than standard definition images for each of the processes except for the on-screen display. The larger number of pixels in a high-definition image translates not only into a higher display data rate for the display processor 175 but higher data rates for fetching reference data from the memory 120 by the motion compensation processor 161, higher data rates for providing decoded image data to the memory 120 and higher data rates for both storing the received bit-stream data and providing the stored bit-stream data to the VLD processor 118. In processing images of this type, it is advantageous to reduce the number of memory operations needed to decode the image sequence.

The present invention reduces the number of memory accesses by the microprocessor 130 when decoding image sequences of this type by eliminating unused or unnecessary User Data fields from the received bit-stream, before the bit-stream is stored into the VBV buffer. This reduction in the bit-stream data that is stored in memory does not violate the VBV buffer constraints because the User Data is not defined in the STD model, as its function may change from bit-stream to bit-stream. Accordingly, under the STD model, the decoding of User Data is assumed to have no effect on the decoding and display of image data. Thus, even though the User Data may be counted in the vbv_buffer_size_ value of the Sequence header, it may be ignored without affecting the timing of the decoding operation.

Figure 2:
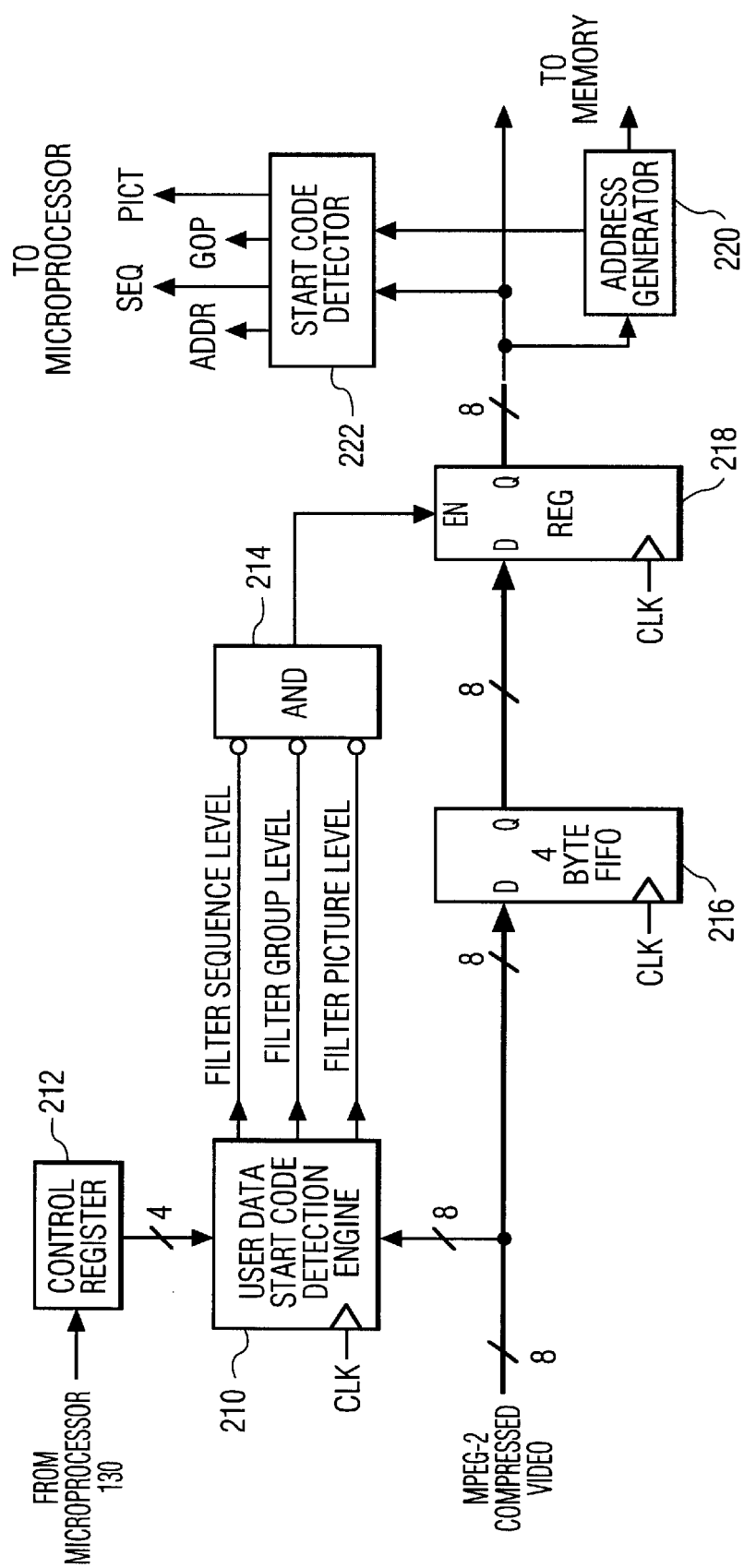
FIG. 2 is a block diagram of a parser suitable for use in the decoder shown in FIG. 1.

FIG. 2 is a block diagram of circuitry suitable for use as the parser 116 shown in FIG. 1. In the circuitry shown in FIG. 2, the MPEG bit-stream is applied, 8-bits at a time, to a User Data start code detection engine 210 and to a 4-byte first in first out (FIFO) memory 216. The detection engine 210 is also coupled to receive a 4-bit value from a control register 212. This value is provided by the microprocessor 130 shown in FIG. 1. The start code detection engine is described in detail below with reference to FIG. 4.

Briefly, the User Data start code detection engine 210 includes a state machine which monitors the start code values occurring in the MPEG-2 bit-stream and changes state as different levels of the bit-stream are received. The detection engine 210 monitors start codes for the Sequence, Group of Pictures and Picture layers. It also monitors start codes for the beginning of a User Data entry in the data stream, as described below with reference to FIGS. 3A through 3D.

When a User Data entry is found in the bit-stream, the detection engine 210 compares the current state of the received bit-stream to values provided in the control register 212 to determine if the detected User Data should be passed to the VBV buffer or should be inhibited. If it is determined in the detection engine 210 that a particular User Data field should be inhibited, the appropriate filter signal: Filter Sequence Level, Filter Group Level or Filter Picture Level is asserted. These signals are applied to respective inverted input terminals of an AND gate 214 the output signal of which is applied to the enable input of a register 218.

The data input port of register 218 is coupled to receive the output signal provided by the 4 byte FIFO 216. In the exemplary embodiment of the invention, the 4 byte FIFO 216 operates to delay the bytes of the bit-stream while they are being processed by the User Data start code detection engine 210. The User Data start code detection engine 210, 4 byte FIFO 216 and register 218 are synchronized through the signal CLK applied to the their respective clock input terminals. The output signal of the register 218 is the output signal of the parser 116 shown in FIG. 1. This signal is applied to the memory 120 via the RAC interface 170. As described above, data provided by the parser 116 is stored into the VBV buffer of the bit-stream decoder.

Also coupled to receive the output signal of the register 218 are an address generator 220 and a start code detection engine 222. The start code engine 222 detects start codes for the Sequence, Group of Pictures and Picture layers. The address generator 220 provides address values for the memory 120 into which the data provided by the register 218 are to be stored. For each Sequence, Group of Pictures and Picture start code, the start code detection engine 222 sends, to the microprocessor 130, an indication of the type of start code and an address value in the memory 120 into which the start code is written. As described above, the microprocessor 130 uses this information to fetch the headers for these records from the memory 120 and decode the fetched header data for use by the decoder 110.

Figure 3A:
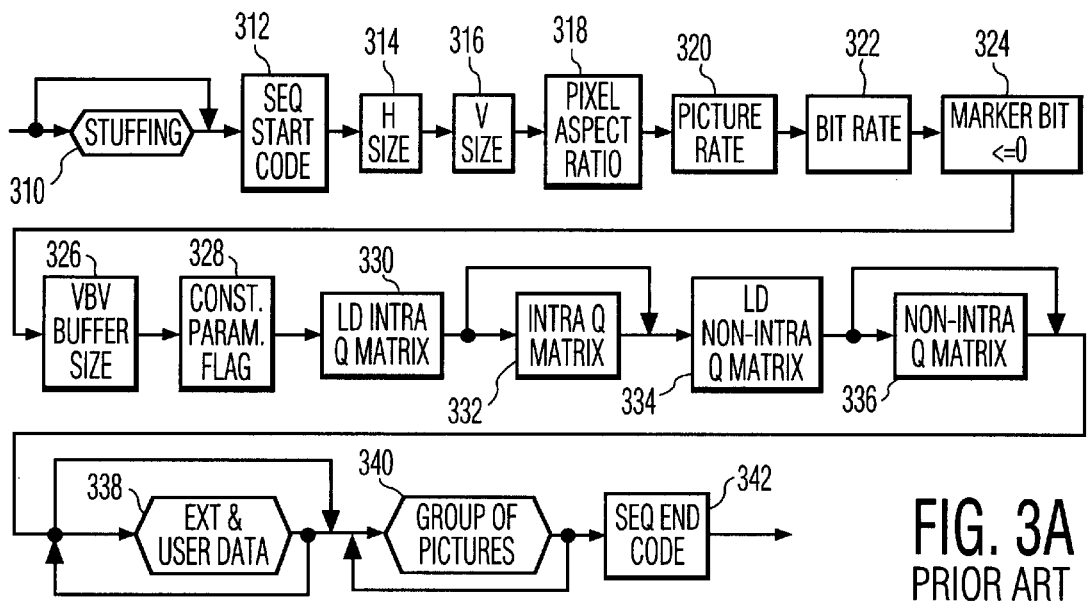
FIGS. 3A through 3D (prior art) are syntax diagrams of the MPEG-2 bit-stream which are useful for describing the operation of the subject invention.
Figure 3B:
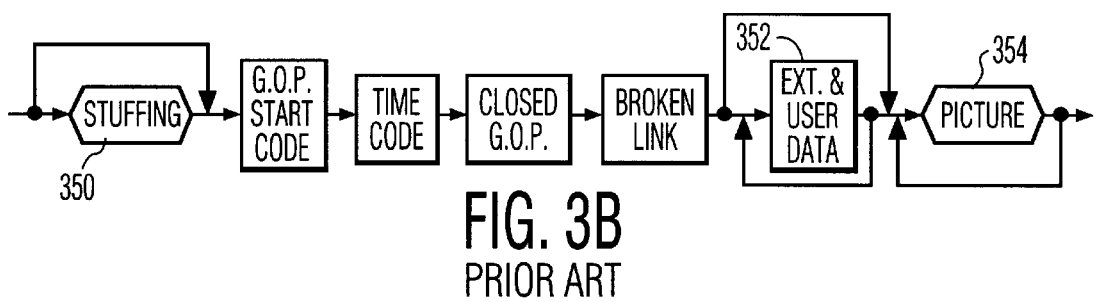
Figure 3C:
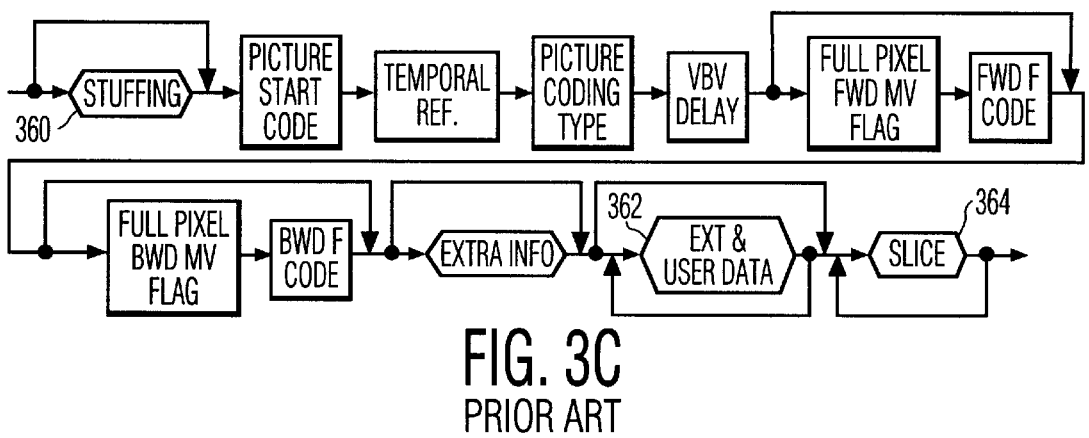
Figure 3D:
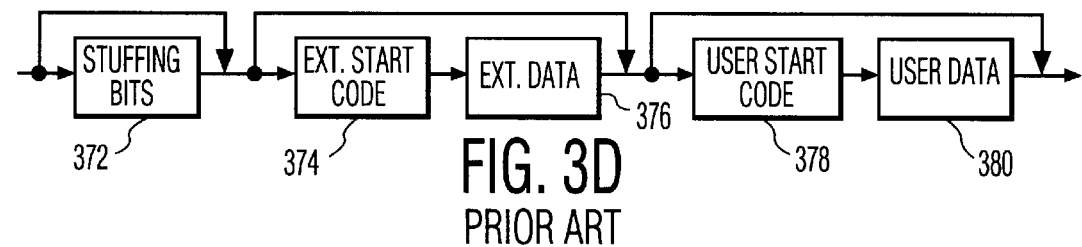

As described above, the MPEG-2 standard defines 5 layers of information for a sequence of images. These are the Sequence layer, the Group of Pictures layer, the Picture layer, the Slice layer and the Macroblock layer. FIGS. 3A through 3C are syntax diagrams which illustrate the structure of the Sequence, Group of Picture and Picture layers, the layers which may contain a User Data entry. FIG. 3D is a syntax diagram which illustrates the structure of the Extension and User Data field of any of these layers.

These various layers are defined in the above-referenced document which describes the MPEG-2 standard. Briefly, the Sequence layer includes the other four layers. In the materials that follow, the layers are also referred to as records. Thus, a Sequence record includes at least one Group of Pictures records which, in turn, include at least one Picture record and so on, down to the Macroblock record. Because User Data may only appear in the Sequence, Group of Pictures and Picture layers, only these layers are described below. The Sequence layer defines the starting point of a set of images which can be decoded based only on the information following the start of the Sequence. The next lower layer, the Group of Pictures layer, defines a subset of the images contained in the Sequence. The images in the Group of Pictures layer generally include at least one image which has been encoded using only data in the image (an intra-encoded image) and several images which have been encoded using motion-prediction encoding techniques (predictively or bidirectionally encoded images). Immediately below the Group of Pictures layer is us the Picture layer. The data records at this layer define single image frames.

FIG. 3A defines the syntax of the Sequence layer. In the MPEG-2 description, a Sequence is defined by a Sequence start code followed by a set of parameters to be used for the Sequence, one or more Group of Pictures records and a Sequence end code. Among the parameters that may be provided are quantization matrixes which define how the coefficients in the individual blocks were quantized during the encoding process.

As described above, the stuffing entry 310 in the Sequence syntax shown in FIG. 3A, represents a zero fill operation which may be performed to conform the timing of the bit-stream to the display of the video image. If, for example, the preceding Sequence contained several frames which could be efficiently encoded, the bit-stream may need to be padded to meet the fixed delay requirements between the transmitter and the receiver. As indicated by the arrow bridging step 310, the stuffing operation is optional in the Sequence syntax.

The next item in the Sequence syntax is the Sequence start code 312. This is defined under the MPEG-2 standard as being 0x000001B3 (hexadecimal notation). All start codes begin with a start code prefix having at least 23 zero-valued bits and a single one-valued bit. The start code value follows the 23 zeros and the single one and determines the type of start code. Table 1 lists start code values which are relevant to the subject invention.

TABLE 1

| Start Code | Hexadecimal Value |
| --- | --- |
| Picture | 0x00 |
| Sequence | 0xB3 |
| Group of Pictures | 0xB8 |
| User Data | 0xB2 |

In addition to these start codes, the Sequence, record ends with an end code that has the same general format as a start code and an end code value of 0xB7.

Following the Sequence start code, the first parameter to be defined for the Sequence is the horizontal size 314. This value defines a number of picture elements (pixels) in each line of the decoded video image. Following the horizontal size parameter 314 is the vertical size parameter 316. This parameter defines the number of active lines in the decoded video image. The pixel aspect ratio 318 defines the aspect ratio of the decoded television image.

The next item in the syntax, the picture rate 320 defines the number of pictures per second that will be displayed. This ranges from approximately 24 pictures per second to 60 pictures per second. The bit rate parameter 322 is an integer which defines the bit rate of the bit-stream measured in units of 400 bits per second. The next item in the syntax is the marker bit 324. This bit always has a value of 1. As described above, the vbv_buffer_size parameter 326 is a 10 bit integer which defines the size of the buffer for the video buffering verifier which is needed to decode this Sequence.

When the next parameter, the constrained parameter flag 328 is set, certain default maximum parameter sizes are assumed under the MPEG-2 standard. This flag is reset for most HDTV images because the limitations defined when the flag is set correspond roughly to the resolution of an NTSC or PAL image.

Following the constrained parameter flag 328 is the load-intra-quantization-matrix flag 330. If this flag is set then the following 64 eight-bit values in the Sequence parameter stream define a quantization matrix to be used for decoding intraframe encoded images. These 64 values are represented by the item 332 in the Sequence syntax shown in FIG. 3A. If the intra quantization matrix flag 330 is reset, then a default quantization matrix is used for decoding intra-encoded images. This default matrix is defined in the MPEG-2 standard and, so, is not transmitted with the Sequence record.

The next item in the Sequence syntax is the load non-intra quantization matrix flag 334. This flag operates in the same manner as the load intra quantization matrix flag, except that, when the flag is set, the 64 eight-bit values 336 following the flag are used for dequantizing pictures that have been bidirectionally or predictively encoded.

The item in the Sequence syntax following the non-intra quantization matrix is Extension and User Data 338. Extension data is defined by a start code value of 0xB5. The Extension data follows this code and continues until another start code is encountered. One start code which may be encountered is the User Data start code. In the MPEG-2 the User Data start code value is 0xB2. This code identifies the beginning of a User Data field in a Sequence, Group of Pictures or Picture record. As with the Extension data, this data is delimited by another start code. The Extension and User Data fields are provided to allow for expansion and customization of the MPEG-2 standard. As indicated by the arrow bridging block 338, the User Data is optional. The format of the Extension and User Data is described below with reference to FIG. 3D.

After the Extension and User Data 338 are one or more Group of Pictures records 340. As indicated by the backwards arrow bridging item 340 in the syntax diagram, multiple Groups of Pictures may be defined in this part of the Sequence syntax. Following the final Group of Pictures, however, is a Sequence end code 342.

Unless the format of the data transmission is well known, decoding may only begin after a Sequence start code and its accompanying parameters have been processed. To prevent long delays between Sequence headers, it is contemplated in the MPEG-2 standard that these start codes and their associated header blocks may be inserted multiple times in a given Sequence. These header blocks may be inserted, for example, between successive Group of Pictures records.

FIGS. 3B and 3C illustrate the Group of Pictures and Picture layers of the syntax. FIG. 3B represents the syntax of the Group of Pictures item 340 of FIG. 3A. FIG. 3B includes stuffing bits 350, Group of Pictures header parameters, an Extension and User Data field 352 and one or more Picture records 354, which are further defined by the syntax diagram of FIG. 3C. FIG. 3C, in turn, includes stuffing bits 360, various Picture parameters, an Extension and User Data field 362 and one or more Slice records 364. These figures are not described in detail because the syntax is available in the above-referenced MPEG-2 specification document.

FIG. 3D is a syntax diagram of the Extension Data and User Data fields 338, 352 and 362. The Extension and User Data fields begin with optional stuffing data 372, as described above. The next entry is an optional Extension Data record which includes an Extension Start Code 374 and one or more bytes of Extension data. The length of the Extension data field is not limited. The field ends when the next start code is encountered. If User Data is present in the record, this next start code is the User Data Start Code 378, otherwise it is the start code of the next record. The actual User Data follows the User Data Start Code in the Extension and User Data field. As for the Extension Data, the User Data is not limited in its length. The User Data is terminated by a Start Code of another Extension or User Data field or by the Start Code of a next record (Group of Pictures, Picture or Slice) in the bit-stream.

Figure 4:
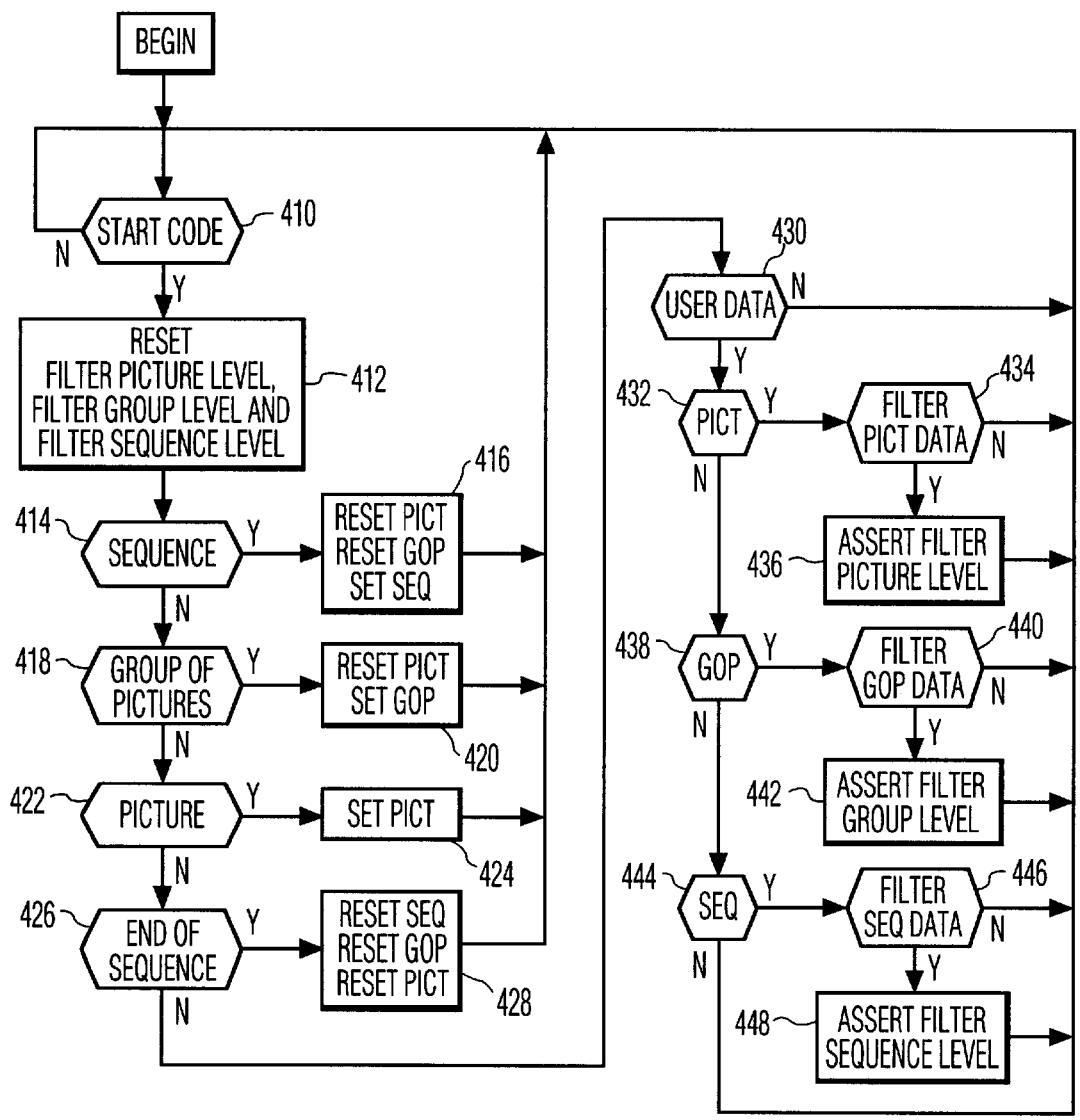
FIG. 4 is a flow-chart diagram which illustrates the operation of the User Data start code detection engine shown in FIG. 2.

FIG. 4 is a flow chart diagram which illustrates the operation of the User Data start code detection engine 210 shown in FIG. 2 above. The first step in this flow chart, step 410 determines if the 8 bits currently applied to the detection engine 210 correspond to a start code value. This block may also be implemented as a state machine which monitors the bit-stream for 4 bytes of data occurring in sequence: a first zero value byte, a second zero value byte, a third byte having a value of 1 and a fourth byte which contains the start code value. Under the MPEG standard, if the first, second, and third bytes are present then the fourth byte must contain a start code value. In the description that follows, the Sequence stop code is included in the definition of an MPEG start code. At step 410, as long as the current byte being processed does not correspond to a start code value, the step 410 loops back upon itself.

Once a start code value is detected at step 410, control passes to step 412 which resets the output signals Filter Picture Level, Filter Group Level, and Filter Sequence Level of the User Data start code detection engine 210. When all of the signals are reset, the AND gate 214 is conditioned to apply the enable signal to the register 218, allowing the bytes of the bit-stream to be stored into the VBV buffer. If any of these signals is asserted, however, the AND gate 214 disables the register 218 preventing bit-stream data from the FIFO 216 from being stored into the memory 120.

After step 412, steps 414, 418, 422 and 426 are performed. Although in the flow chart diagram shown in FIG. 4, these steps are performed in sequence, it is contemplated that they may be performed in parallel. Step 414 determines if the start code value detected at step 410 is a Sequence start code value. If so, step 416 resets two internal Boolean variables, PICT and GOP, and sets an internal variable SEQ. These three Boolean variables mark the level of the bit-stream which is currently being parsed. If the Boolean variable SEQ is set, then the parser 116 (shown in FIG. 1) is processing a Sequence header; if the variable GOP is set, then the parser is processing a Group of Pictures header; finally, if the variable PICT is set, then the parser is processing a Picture header. After step 416, control returns to step 410 to await the arrival of the next start code value.

If, at step 414, the start code value was not a Sequence start code value, step 418 determines if the start code value is for a Group of Pictures. If so, step 420 is executed which resets the Boolean variable PICT and sets the Boolean variable GOP. After step 420, control is transferred back to step 410.

If, at step 418, the start code value was not for a Group of Pictures header, then at step 422 determines if the start code value was for a Picture header. If so, step 424 is executed to set the Boolean variable PICT and control is transferred to step 410.

If at step 422, the start code was found not to be for a Picture header, then step 426 determines if the code was a Sequence stop code and, if so, executes step 428 to reset the Boolean variables SEQ, GOP and PICT. From step 428, control is transferred to step 410, described above.

Step 430 is executed if the start code value from step 410 was not for a Sequence header, Group of Pictures headers or Picture header and was not a Sequence stop code. Step 430 determines whether the start code value indicates the beginning of a User Data field. If it does not, then control is transferred to step 410 to await the arrival of the next start code value.

At step 430, if the start code value is determined to be a User Data start code, then control is transferred to step 432 which determines the state of the Boolean variable PICT. If PICT is set, step 434 is executed to determine the state of a variable Filter PICT Data which is provided in the control register 212 by the microprocessor 130. If this bit is set, control is transferred to step 436 which asserts the Filter Picture Level signal. After step 436, or after step 434 if the Filter PICT Data signal is not set, control is transferred to step 410 to await the arrival of the next start code value. As described above, when the Filter Picture Level signal is asserted at step 436, the User Data start code detected at step 430 and the User Data following that start code value are inhibited from being stored into the VBV buffer area of the memory 120, shown in FIG. 1. Steps 438, 440, and 442 operate the same way as steps 432, 434 and 436 except the User Data field being processed occurs in a Group of Pictures header and the Filter GOP Data signal provided by the microprocessor 130 is tested to determine whether the Filter Group Level signal should be asserted. Finally, steps 444, 446 and 448 operate in the same way as steps 432, 434 and 436 except the User Data field of a Sequence header is processed and the Filter Sequence Level signal is selectively asserted.

The circuitry described above monitors an MPEG-2 bit-stream to selectively delete unneeded User Data from the bit-stream before the bit-stream is stored into the VBV buffer. If the unneeded User Data were not omitted, it would be fetched from the memory 120 by the microprocessor 130, shown in FIG. 1, and immediately discarded. Because it is discarded, the microprocessor will immediately need to fetch additional bit-stream data. The fetching of unneeded data uses valuable memory bandwidth which may be better used for other types of memory operations, especially in the decoding of a high definition (MP@HL) MPEG-2 encoded image data.

The User Data transmitted with an MPEG-2 bit-stream may include information that is selectively used, responsive to viewer requests. For example, one type of data that may be transferred as User Data is multilingual close-caption information. In the exemplary embodiment of the invention shown in FIG. 1, the microprocessor 130 may be coupled to receive viewer commands from a remote control device (not shown). One of these viewer commands may produce a menu, using the OCD 171, that allows the user to select from among French, Spanish and Japanese close caption data. If, for example, the viewer selects Spanish close-caption data, and this data is transmitted in the User Data fields of Picture headers, the microprocessor 130 resets the Boolean signal Filter PICT Data so that the User Data for Picture records is passed to the VBV buffer where it may be processed into Spanish close-caption video overlays.

As set forth above, a Sequence header may be repeated several times during its Sequence record. Assuming the User Data has been received correctly when the first instance of the Sequence header was parsed, User Data fields in any instances of the header following that first instance may be ignored. It is a contemplated that the present invention may be modified to set the Boolean variable Filter SEQ Data when the Boolean variable SEQ is set and a Sequence start code is detected at step 414 of FIG. 4. This allows the decoder to parse the first User Data field for a sequence (because the variable SEQ is initially reset and is reset when an End of Sequence stop code is detected) while ignoring all subsequent instances of the User Data field.

In the exemplary embodiment of the invention described above, User so Data fields may be selectively omitted from the stored bit-streams because they are not used in the decoding operation. By definition, however, User Data fields are not needed to decode an MPEG-2 encoded video image sequence. Thus, even if the User Data fields are used in a particular decoding operation, they may be ignored without adversely affecting the reproduced image. This property of the MPEG-2 bit-stream may be exploited to allow a decoder to selectively omit the User Data fields while decoding an image sequence which is difficult to decode.

To determine when it may need to omit selected ones of the User Data field, the microprocessor may, for example, periodically issue a low-priority request to access data in the memory 120 and monitor the amount of time needed to complete the memory request. If the average amount of time to complete several of these requests exceeds a threshold value, the microprocessor may assert the signal Filter SEQ Data to cause the User Data associated with a Sequence header to be omitted from the stored bit-stream. If omitting this data does not produce an acceptable memory access time, the microprocessor 130 may sequentially assert the signals Filter GOP Data and Filer PICT Data to selectively eliminate the User Data associated with a Group of Pictures headers and Picture headers until an acceptable memory access time is achieved.

Although the invention has been described in terms of an exemplary embodiment, it is contemplated that it may be practiced as outlined above within the scope of the appended claims.

What is claimed:

1. A video signal decoder which decodes signals that have been encoded according a standard (MPEG-2) specified by the moving pictures experts group (MPEG), the encoded video signal including a User Data field having a start code, the apparatus comprising:
   a terminal for receiving the encoded video signal;
   a memory;
   a start code detection engine which detects the start code of the User Data field and an other start code immediately following the User Data field and which generates an inhibit signal that is asserted when the User Data start code is detected and is reset when the other start code is detected; and
   register means responsive to the inhibit signal for storing the received encoded video signal into the memory when the inhibit signal is reset and for blocking storage of the received encoded video signal when the inhibit signal is asserted.

2. A video signal decoder according to claim 1, wherein the encoded video signal includes a plurality of Sequence headers, a plurality of Group of Picture headers and a plurality of Picture headers, each of which may include a User Data field, wherein:
   the start code detection engine detects Sequence start codes, Group of Picture start codes and Picture Start codes to change internal state variables; and
   the video signal decoder further comprises:
      processing means for determining which types of headers include User Data fields that are used by the decoder; and
      means for signaling the start code detection engine to inhibit storage of User Data fields of types of headers for which User Data fields are not used by the decoder.

3. A video signal decoder according to claim 2, wherein the processing means includes means for monitoring performance of the video signal decoder to successively inhibit storage of User Data fields of Sequence headers, Group of Picture headers and Picture headers, responsive to the performance monitoring means.

4. A video signal decoder according to claim 2, wherein the encoded video signal includes at least one Sequence record, the Sequence record including the plurality of Sequence headers and the start code detection engine asserts the inhibit signal for User Data fields in each instance of the Sequence header following the first instance of the Sequence header in the Sequence record.

5. A video signal decoder according to claim 2, further including:

means for allowing a user to select a facility which employs User Data in one of the header types; and the processing means includes means, responsive to the selection by the user to signal the start code detection engine to not inhibit the storage of User Data fields for the one selected header type.

6. A method for reducing memory accesses in a video signal decoder which decodes signals that have been encoded according a standard (MPEG-2) specified by the moving pictures experts group (MPEG), the encoded video signal including a User Data field having a start code, the method comprising the steps of:

receiving the encoded video signal;

detecting the start code of the User Data field and an other start code immediately following the User Data field to generates an inhibit signal that is asserted when the User Data start code is detected and is reset when the other start code is detected; and storing the received encoded video signal into a memory when the inhibit signal is not asserted and inhibiting the storage of the received encoded video signal into the memory when the inhibit signal is asserted.

7. A method according to claim 6, wherein the encoded video signal includes a plurality of Sequence headers, a plurality of Group of Picture headers and a plurality of Picture headers, each of which may include a User Data field, wherein:

the step of detecting the start code of the User Data field also detects Sequence start codes, Group of Picture start codes and Picture Start codes to change internal state variables; and the method further comprises the steps of:

determining which types of headers include User Data fields that are used by the decoder; and inhibiting storage of User Data fields of types of headers for which User Data fields are not used by the decoder.

8. A method according to claim 7, further including the step of monitoring performance of the video signal decoder to successively inhibit storage of User Data fields of Sequence headers, Group of Picture headers and Picture headers.

9. A method according to claim 7, wherein the encoded video signal includes at least one Sequence record, the Sequence record including the plurality of Sequence headers and the step of detecting the User Data start code asserts the inhibit signal for User Data fields in each instance of the Sequence header following the first instance of the Sequence header in the Sequence record.

10. A method according to claim 7, further including the steps of:

allowing a user to select a facility which employs User Data in one of the header types; and allowing storage of the User Data fields for the one selected header type responsive to the selection by the user.

* * * * *